Feb. 4, 1936.  W. H. COLBERT  2,029,911
REAR VIEW MIRROR
Filed July 12, 1935
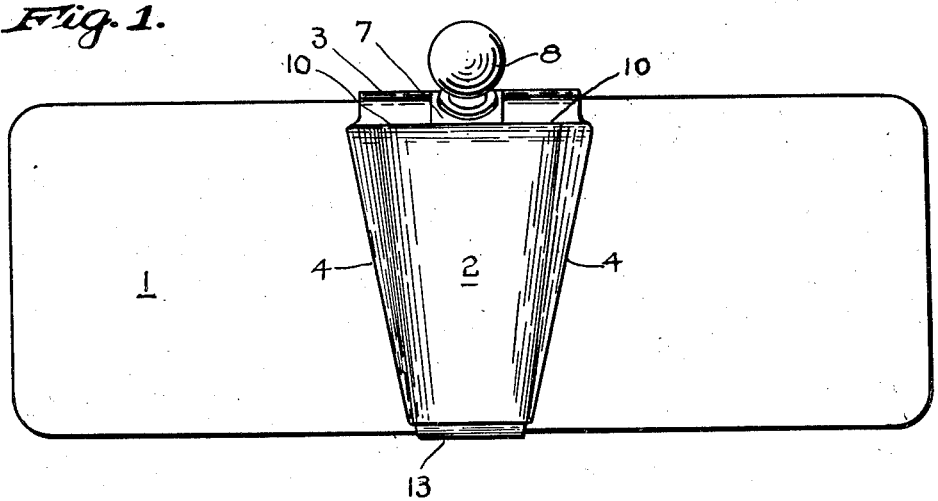
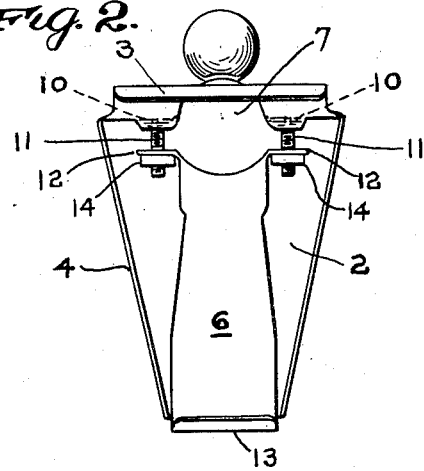
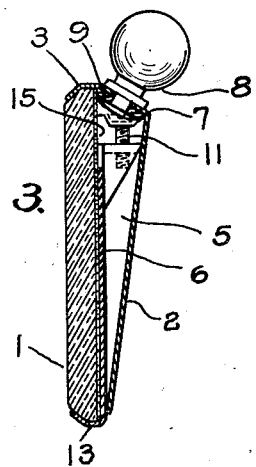
INVENTOR.
WILLIAM H. COLBERT.
BY James C. Bradley
ATTORNEY.

Patented Feb. 4, 1936

2,029,911

UNITED STATES PATENT OFFICE 2,029,911

REAR VIEW MIRROR

William H. Colbert, Brackenridge, Pa., assignor to Liberty Mirror Works, a corporation of Pennsylvania Application July 12, 1935, Serial No. 31,001

4 Claims. (Cl. 88—98)

The invention relates to rear view mirrors for automobiles, and particularly to the means whereby the mirror plate is supported from a post or stud which is subject to angular adjustment, the universal support for the stud being illustrated and claimed in my copending application, Serial No. 700,795, filed December 4, 1933. The invention has for one of its objects the provision of a bracket construction which is easily applied and removed from the mirror plate, and which is compact and secure, adapting it particularly for service when a clock is carried by one end of the mirror plate. A further object is the provision of a bracket having the clamping bolts or screws housed between the mirror plate and the casing of the bracket protecting them from injury and giving a bracket of neater appearance than those heretofore commonly used. One embodiment of the invention is shown in the accompanying drawing, wherein:

Figure 1 is a rear view showing the bracket applied to a mirror plate. Fig. 2 is a front view of the bracket removed from the mirror plate. Fig. 3 is a vertical section at the center of the bracket.

Referring to the drawing, 1 is a mirror plate of glass having the usual coating of silver on its rear face and provided at its edges with the usual bevel, as indicated in Fig. 3. At the back of the mirror is the casing or shell 2 of the bracket formed of light sheet metal, such as steel, with its upper end provided with a hook portion 3 which fits around the plate 1 at its upper edge. This shell or casing inclines away from the plate 1 from its lower end upward, as indicated in Fig. 3, and in horizontal cross section is curved, so that its side edges 4, 4 come closely adjacent the back of the mirror plate. This provides a housing space 5 (Fig. 3), in which the movable clamping member 6 is mounted.

The upper end of the casing is provided with an inclined closure wall 7, to which the ball stud 8 is riveted. To reinforce the wall 7, a small plate 9 (Fig. 3) is provided through which the end of the shank of the stud projects, such end being riveted over and preferably welded to give additional security. On each side of the inclined end wall is a flat portion 10, which is slightly recessed to carry the heads of the screw bolts 11, 11.

The clamping member 6 is of sheet metal having a pair of wings 12, 12 at its upper end and a hook 13 at its lower end. The bolts 11, 11 extend through the wings 12, 12 and are provided with nuts 14, 14 at their lower ends. The hook 13 fits around the bevel at the lower edge of the mirror plate. A sheet of fiber or cardboard 15 lies between the back of the mirror plate and the member 6 to prevent such member contacting with the coating on the back of the plate.

In assembling, the parts are positioned, as indicated in Figs. 1 and 3 with the hooks 3 and 13 loosely engaging the upper and lower edges of the mirror plate, and the screw bolts 11, 11 are then tightened by means of a screw driver which engages their slotted upper ends lying above the top wall of the casing. This brings the hooks into tight clamping relation with the mirror plate. The arrangement as described, gives a very secure support of the mirror plate which is easily applied and detached. At the same time, a neat appearance is secured, due to the housing of the clamp 6 and operating screw bolts inside the hollow casing, the slotted screw heads being hardly noticeable when the mirror is in service, because of their location on the top wall of the casing. It will be understood that the silvering on the back of the mirror is protected by the usual coatings of shellac and mirror backing paint or other suitable covering.

What I claim is:

1. In a rear view mirror, a mirror plate and a supporting bracket therefor comprising a casing member of sheet metal extending across the back of the plate with its side edges closely adjacent the rear face of the plate and its central portion spaced away therefrom to provide a housing space, said casing having at one end a closure wall extending transversely of said housing space and provided with a hook fitting around the edge of the mirror plate, a supporting stud extending through said closure wall and rigidly attached thereto, a clamping plate in said housing space with one edge constituting a hook and fitting around the edge of the mirror plate in opposition to said first mentioned hook, and screw adjusting means carried by the closure wall and adapted to move the clamping plate across the back of the mirror plate.

2. In a rear view mirror, a mirror plate and a supporting bracket therefor comprising a casing member of sheet metal extending across the back of the plate from its upper to its lower edge with its side edges turned toward the mirror plate and closely adjacent thereto and its central portion spaced away from the mirror plate to provide a housing space, said casing having at its upper end a closure wall extending transversely of said housing space and provided with a hook fitting around the upper edge of the mirror plate, a supporting stud riveted to said closure wall, a clamping plate in said housing space with its lower end formed into a hook and fitting around the lower edge of the mirror plate in opposition to said first mentioned hook, and screw adjusting means extending through said closure wall and adapted to move the clamping plate in a vertical direction.

3. In a rear view mirror, a mirror plate and a supporting bracket therefor comprising a casing member of sheet metal extending across the back of the plate with its side edges closely adjacent the rear face of the plate and its central portion spaced away therefrom to provide a housing space, said casing having at one end a closure wall extending transversely of said housing space and provided with a hook fitting around the edge of the mirror plate, a supporting stud extending through said closure wall and rigidly attached thereto, a clamping plate in said housing space with one edge constituting a hook and fitting around the edge of the mirror plate in opposition to said first mentioned hook, and a pair of threaded bolts extending through the closure wall on opposite sides of said stud and having operative connection at their inner ends with said clamping plate so that the rotation of the bolts will adjust the position of the clamping plate.

4. In a rear view mirror, a mirror plate and a supporting bracket therefor comprising a casing member of sheet metal extending across the back of the plate from its upper to its lower edge with its side edges turned toward the mirror plate and closely adjacent thereto and its central portion spaced away from the mirror plate to provide a housing space, said casing having at its upper end a closure wall extending transversely of said housing space and provided with a hook fitting around the upper edge of the mirror plate, a supporting stud riveted to said closure wall, a clamping plate in said housing space with its lower end formed into a hook and fitting around the lower edge of the mirror plate in opposition to said first mentioned hook, said plate having a pair of wings at its upper end projecting at right angles to the body of the plate, a pair of screw bolts extending through said closure wall and said wings with their heads resting on said wall, and nuts threaded on said bolts beneath the wings.

WILLIAM H. COLBERT.